US008703887B2

(12) United States Patent
Xu et al.

(10) Patent No.: US 8,703,887 B2
(45) Date of Patent: Apr. 22, 2014

(54) PROCESS FOR THE PRODUCTION OF AN ETHYLENE POLYMER USING A CHROMIUM CONTAINING CATALYST

(75) Inventors: Wei Xu, Riyadh (SA); Ali Saad Headan, Riyadh (SA); Sirajudeen Mohamed, Riyadh (SA); Atieh Aburaqabah, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 13/263,793

(22) PCT Filed: Apr. 6, 2010

(86) PCT No.: PCT/EP2010/002174
§ 371 (c)(1),
(2), (4) Date: Dec. 20, 2011

(87) PCT Pub. No.: WO2010/115613
PCT Pub. Date: Oct. 14, 2010

(65) Prior Publication Data
US 2012/0123071 A1    May 17, 2012

(30) Foreign Application Priority Data
Apr. 10, 2009    (EP) ...................................... 09075176

(51) Int. Cl.
*C08F 4/24*    (2006.01)

(52) U.S. Cl.
USPC ........................................... 526/134; 526/90

(58) Field of Classification Search
USPC ................ 526/106, 90, 100, 104, 105, 124.1, 526/131–134, 136, 141, 151, 195, 196, 198
See application file for complete search history.

(56) References Cited

U.S. PATENT DOCUMENTS 3,353,682 A * 11/1967 Pall et al. ...................... 210/505
3,637,591 A * 1/1972 Coran ............................ 528/89
3,686,156 A * 8/1972 Hagman ........................ 525/352
3,956,252 A * 5/1976 Saeda et al. ..................... 526/74
4,003,712 A    1/1977 Miller
4,182,810 A    1/1980 Willcox
5,331,070 A    7/1994 Pettijohn et al.
5,750,816 A    5/1998 Araki et al.
6,716,938 B2 * 4/2004 Shveima et al. .............. 526/106
6,989,344 B2 * 1/2006 Cann et al. ..................... 502/150
2005/0137364 A1    6/2005 Cai et al.
2007/0117939 A1 * 5/2007 Iaccino et al. .................. 526/90

FOREIGN PATENT DOCUMENTS

DE    19607888 A1    9/1996
EP    0067607 A2    12/1982
EP    0107127 A1    5/1984

OTHER PUBLICATIONS

International Search Report; International Application No. PCT/EP2010/002174; International Filing Date: Apr. 6, 2010; Date of Mailing: May 26, 2010; 7 pages.
Written Opinion of the International Searching Authority; International Application No. PCT/EP2010/002174; International Filing Date: Apr. 6, 2010; Date of Mailing: May 26, 2010; 5 pages.
Peacock; "Handbook of Polyethylene: Structures, Properties, and Applications"; Chapter 3—Production Processes; 2000; 26 Pages.

* cited by examiner

*Primary Examiner* — Ling Choi
*Assistant Examiner* — Catherine S Branch
(74) *Attorney, Agent, or Firm* — Cantor Colburn LLP

(57) ABSTRACT

The invention is directed to a process for the production of high density polyethylene by polymerization of ethylene in the presence of a supported chromium oxide based catalyst and an activator characterized in that the activator comprises the reaction mixture of a boron compound and/or an alkyl aluminum compound and a nitrogen containing compound wherein the boron compound is a ($C_1$-$C_{10}$) alkyl boron compound or a ($C_5$-$C_{20}$) aromatic boron compound, wherein the alkyl aluminum compound is an organo aluminum compound having the formula $AlR_3$ in which R is a hydrocarbon radical containing 1-10 carbon atom and wherein the nitrogen containing compound comprises —$NH_2$, —NHR, —$NR_2$, wherein R may be an alkyl or a substituted alkyl having from 1 to 40 carbon atoms.

15 Claims, No Drawings

PROCESS FOR THE PRODUCTION OF AN ETHYLENE POLYMER USING A CHROMIUM CONTAINING CATALYST

CROSS REFERENCE TO RELATED APPLICATIONS

This application is a 371 of International Application No. PCT/EP2010/002174, filed Apr. 6, 2010, which claims priority to European Application No. 09075176.9, filed Apr. 10, 2009, both of which are hereby incorporated by reference in its entirety.

TECHNICAL FIELD

The invention relates to the polymerisation of high density ethylene in the presence of a supported chromium oxide based catalyst.

BACKGROUND

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include both slurry and gas phase processes.

The polymerisation of ethylene with supported chromium based catalysts is disclosed by Kevin Cann in "Comparison of silyl chromate and chromium oxide based olefin polymerisation catalysts" (Macromolecular Symp, 2004, 213, 29-36).

The chromium oxide based catalyst, which is commonly referred to in the literature as "the Phillips catalyst", can be obtained by calcining a chromium compound carried on an inorganic oxide carrier in a non-reducing atmosphere. The chromium oxide catalysis and the ethylene polymerisation with this specific catalyst are disclosed in "Handbook of Polyethylene" by Andrew Peacock at pages 61-64.

The silyl chromate catalyst consists of silylchromate (bis-triphenylsilyl chromate) absorbed on dehydrated silica and subsequently reduced with for example diethylaluminum ethoxide. The silylchromate catalysts are more expensive than chromium oxide catalysts.

Although similar in structure the oxo and triphenylsilyl chromate catalyst perform very differently in polymerisation reactions. Silylchromate-based catalysts generally produce desirable polyethylenes relative to those produced by chromium oxide-type catalysts. Silylchromate produced polyethylenes generally have a broader molecular weight distribution than those produced using chromium oxide-type catalysts. The broader molecular weight distribution leads to better processability of the resulting polyethylene. However, the productivities of silylchromate-based catalysts are typically much poorer than those realized using chromium oxide-based catalysts.

Chromium oxide-on-silica catalysts result in good production rates however certain applications require a broader molecular weight distribution.

Another disadvantage of the polymers produced with silyl-chromate-based catalysts is that benzene may be present in the end product which limits its application in food packaging. It is highly desirable to have a benzene free catalyst system in combination with the high productivity of the chromium oxide-on-silica catalysts and at the same time is able to produce high density polyethylene (HDPE) with broad or bimodal molecular weight distributions.

SUMMARY

It is the object of the present invention to provide a high density ethylene polymerisation process in the presence of chromium oxide based catalysts which results in high density ethylene polymers with a broader molecular weight distribution (MWD) while maintaining the other required characteristics for example high catalyst activity and polymer yield.

DETAILED DESCRIPTION

The process according to the invention is characterised in that high density ethylene polymer is obtained by polymerizing ethylene in the presence of a supported chromium oxide based catalyst and an activator comprising a reaction mixture of a boron compound and/or an alkyl aluminum compound and a nitrogen containing compound.

The combination of the supported chromium oxide based catalyst and the specific activator comprising the reaction product of the boron compound and/or the alkyl aluminum compound and a nitrogen containing compound results in a broader MWD of the polyethylene.

Furthermore the combination of the chromium catalyst and the activator results in a high productivity of the high density ethylene polymerisation process.

Another advantage of the process according to the present invention is that the obtained products show a behaviour similar to the products obtained with the silylchromate on silica catalyst.

A further advantage is the use of a benzene free catalyst system.

Furthermore bimodal HDPE polymers with broad MWD can be produced with the chromium based catalyst and the activator comprising the reaction mixture of an alkyl boron compound and/or an alkyl aluminium compound and a nitrogen containing compound.

The chromium containing catalyst contains a support. Preferably the support is a silica support. The silica may have a surface area (SA) larger than 150 $m^2/g$ and a pore volume (PV) larger than 0.8 $cm^3/g$. The support may be modified so as to include cogels such as for example silica-titania or silica-alumina and by the replacement of silica by alumina or amorphous aluminium phosphates. Furthermore, the support may comprise a tergel which is produced by mixing a chromium source with the silica and titania compound. The chromium containing catalyst may also be doped with chemical compounds containing for example aluminium, titanium, phosphorus, boron or fluor for example by impregnation of the porous chromium containing supports with a solution of any one of these compounds.

Preferably, the catalyst is an unmodified silica supported chromium based catalyst having a pore volume larger than 0.8 $cm^3/g$ and a specific surface area of at least 150 $m^2/g$.

The properties of the catalyst, pore volume and specific surface area are determined before the catalyst is activated at an elevated temperature.

The amount of chromium in the catalyst is generally at least 0.5% by weight. Preferably the amount of chromium in the catalyst is at least 1.0% by weight.

The average particle size ($D_{50}$) of the catalyst may range between for example 15 and 150 micrometers. Generally, the catalyst is activated before being applied in the polymerisation reaction. The activation may take place under different conditions. The activation generally takes place at an elevated temperature, for example, at a temperature above 450° C. The activation may take place in different atmospheres, for example in dry air. Generally, the activation takes place at least partially under an inert atmosphere preferably consisting of nitrogen. At the same time the temperature is raised slowly. It has been found to be advantageous to change from the nitrogen atmosphere to an atmosphere of dry air at a temperature of at most 700° C. The activation time after reaching the maximum temperature may last for several minutes to several hours. This activation time is at least 1 hour but it may be advantageous to activate much longer.

Preferably the boron compound is a $(C_1-C_{10})$ alkyl boron compound or a $(C_5-C_{20})$ aromatic boron compound.

Suitable $(C_1-C_{10})$ alkyl boron compounds include for example trimethyl boron, triethyl boron and tripropyl boron.

Preferably, the alkyl boron compound is triethyl boron. If triethyl boron is used as a promoter, generally the boron concentration in the polymerisation reactor is less than 30 ppm of boron based on the diluent. Preferably, the concentration of boron is less than 20 ppm and more preferably the concentration is less than 5 ppm boron.

The alkylaluminum compound may be selected from an organo aluminium compound having the formula $AlR_3$ in which R is a hydrocarbon radical containing 1-10 carbon atom. Suitable examples of organo aluminum compound of the formula $AlR_3$ include for example trimethyl aluminium, triethyl aluminium, triisobutyl aluminium, tri-n-hexyl aluminium and tri octyl aluminium. Preferably trimethyl aluminium, triethyl aluminium or triisobutyl aluminium is applied.

Examples of suitable nitrogen containing compound include nitrogen containing groups such as for example $—NH_2$, $—NHR$, $—NR_2$, wherein R may be an alkyl or a substituted alkyl having from 1 to 40 carbon atoms, preferably from 1 to 20 carbon atoms. The nitrogen containing compound includes substituted derivatives thereof.

According to a preferred embodiment of the invention the nitrogen containing compound is a compound having the formula $R—NH_2$ in which R represents an alkyl having from 2 to 20 carbon atoms.

According to a further preferred embodiment of the invention the nitrogen containing compounds is decylamine, undecylamine, octylamine, octadecylamine, dodecylamine, N-methyloctadecylamine, N-ethyl-dodecylamine, hexadecylamine and/or N—N" dimethyl-n-octadecylamine More preferably the nitrogen containing compound is octadecylamine, dodecylamine or hexadecylamine.

The process according to the present invention does not comprise pyrrole-containing compounds such as for example hydrogen pyrrolide or pyrrole, derivatives of hydrogen pyrrolide and metal pyrrolide complexes because these compounds are unsuitable to be applied as the nitrogen containing compound.

Generally, the molar ratio of aluminium to nitrogen ranges between 0.1:1 and 4:1.

Generally, the molar ratio of borium to nitrogen ranges between 0.1:1 and 4:1.

Generally, the molar ratio of aluminium to chromium ranges between 0.01:100 and 100:1.

Preferably, the ratio of weight equivalents of aluminium to weight equivalents of chromium ranges between 0.1:100 and 100:1.

The productivity of the catalyst ranges between 100 gram PE/gram Cr-cat per hour and 50000 gram PE/gram Cr-cat per hour by selecting the amount of the chromium containing catalyst.

The polymerisation takes place in a single reactor.

The polymerisation may be performed via a gas phase process or via a slurry process.

Gas fluidized bed polymerisation processes are summarised by Than Chee Mun in Hydrocarbons 2003 "Production of polyethylene using gas fluidised bed reactor". Gas phase polymerisation generally involves adding gaseous monomers into a vertically oriented polymerisation reactor filled with previously formed polymer, catalyst particles and additives. Generally the polymerisation in the gas phase polymerisation systems takes place at temperatures between 30° C. and 130° C. with super atmospheric pressures. The rising gas phase fluidizes the bed, and the monomers contained in the gas phase polymerize onto supported catalyst or preformed polymer during this process. Upon reaching the top of the reactor, unreacted monomer is recycled, while polymer continually falls down along the sides of the reactor. Examples of suitable gas phase polymerisations are disclosed in for example U.S. Pat. No. 4,003,712 and US-A-2005/0137364.

In slurry reactors, a low boiling hydrocarbon solvent such as isobutane, hexane or heptane is employed as a continuous medium, and monomer, catalyst etc added to this continuous phase. The polymer formed is insoluble in the reaction medium, producing slurry of polymer and catalyst. Slurry reactors may be divided into loop reactors and boiling solvent reactors. Heat is at least partially removed by the heat of vaporization of solvent, which is later condensed and returned to the reactor. Polymer is removed as slurry from the bottom of the reactor and flashed to remove solvent, which is recycled. Slurry loop reactors may be horizontally or vertically oriented. Water flowing between the tubes serves to remove heat and maintain a relatively constant temperature. Slurry flow is achieved by pumps which maintain the polymer slurry at relatively high velocity. Product is removed either continuously or discontinuously from a "settling leg." Preferably, the polymerisation of ethylene takes place in a diluent at a temperature of between 80° C. and 110° C. Suitable diluents include, for example, isobutane and propane.

In the case of the production of an ethylene copolymer the alpha olefin co monomer may be propylene, 1-butene, 1-pentene, 4-methyl-1-pentene, 1-hexene and/or 1-octene.

The activator may be added to the catalyst directly or separately. Separated injections to the reactor are preferred.

The HDPE reactor powder obtained with the process according to the present invention has:
  a high-load melt index (HLMI)≥0.1 g/10 min and ≤50 g/10 min (according to ISO 1133)
  $M_w/M_n$≥10 and ≤100 (according to size exclusion chromatography (SEC) measurement)
  a density ≥945 kg/m$^3$ and ≤965 kg/m$^3$ (according to ISO1183).

The ethylene polymers obtained with the process according to the invention may be combined with additives such as for example lubricants, fillers, stabilizers, antioxidants, compatibilizers and pigments. The additives used to stabilize the copolymers may be, for example, additive packages including hindered phenols, phosphites, UV stabilisers, antistatics and stearates.

An anti static agent can be used to suppress fouling of the reactor wall. Suitable anti static agents are disclosed for instance in U.S. Pat. No. 4,182,810 and EP107127.

The ethylene polymers may be extruded or blow-moulded into articles such as for example bottles, containers, fuel tanks and drums, and may be extruded or blown into films.

U.S. Pat. No. 5,331,070 A discloses the polymerisation of olefins in the presence of a catalyst system composition comprising chromium supported on an inorganic oxide support, a pyrrole-containing compound and a metal alkyl. The pyrrole-containing compound can be any pyrrole-containing compound such as for example hydrogen pyrrolide or pyrrole, derivatives of hydrogen pyrrolide and metal pyrrolide complexes. In contrast to the process according to U.S. Pat. No. 5,331,070 A the process according to the present invention does not apply a pyrrole-containing compound.

The process according to U.S. Pat. No. 5,331,070 A produces an olefin comonomer in-situ. The obtained polymer has a decreased density and an increased branching. According to Table I the polymer yield and the activity decrease because of the presence of the pyrrolide whereas the specific activator combination according to the present invention results in an improved productivity.

DE19607888 A1 discloses a process for the oligomerization of alpha-olefins in a solvent using a chromium-based catalyst system comprising at least (a) an unsupported chromium compound, (b) at least one nitrogen-containing compound selected from amines, amides and imides, and (c) an alkylaluminum compound, and the catalyst components and by-product polymers are recovered simultaneously from the reaction solution. Preferred examples of the chromium compounds are chromium alkoxides, chromium carboxylates, chromium diketonates and salts of chromium with anions of ketoester and chromium halides. DE19607888 A1 does not disclose a supported chromium oxide based catalyst. The nitrogen-containing compound is selected from nitriles, amines and amides such as for example acetonitrile, pyridine, dimethylpyridine, dimethylformamide, N-methylformamide, aniline, nitrobenzene, tetramethylethylenediamine, diethylamine, isopropylamine, hexamethyl disilazane and pyrrolidone.

It is the object of the process according to DE19607888 A1 to provide an industrially advantageous process for preparing alpha.-olefin oligomers which process is simple and capable of efficiently separating the by-product polymers and catalyst components. In contrast to the polymerisation process according to the present invention the process according to DE19607888 A1 is directed to an oligomerisation process wherein the polymer is an undesired by-product. DE 19607888 A1 does not disclose a process for the production of high density polyethylene by polymerisation of ethylene in the presence of a supported chromium oxide based catalyst and an activator comprising the reaction mixture of a boron compound and/or an alkyl aluminium compound and a nitrogen containing compound.

EP 67607 A2 discloses a catalyst containing a solid catalyst component and an organometallic compound component. The solid catalyst is obtained by calcining a reaction product of (a) at least one compound selected from an amine compound, a phosphoric acid amide, a hydro carbyloxy compound of titanium, vanadium, hafnium or zirconium and a specific germanium compound with (b) at least one chromium compound, said reaction product being supported on an inorganic oxide carrier.

It is the object of EP 67607 A2 to provide a catalyst suitable for use in the polymerization of olefins, which catalyst has a high activity and is capable of producing olefin polymers having excellent melt flowability. The organometallic compound component is selected from a specific hydrocarbon-soluble organomagnesium component, an organoaluminum component obtained by reacting a trialkylaluminum compound with a carbinol, a silanol or siloxane, a component comprising the specific hydrocarbon-soluble organomagnesium component and an organoaluminum component, a component comprising the specific hydrocarbon-soluble organomagnesium component and an organoboron, organozinc, or organolithium compound and a component comprising an organoaluminum component and an organoboron, organozinc or organolithium compound.

The process according to EP 67607 A2 and the process according to the present invention are completely different because amongst others in the case that an anime is applied in the process according to EP 67607 A2 this amine is calcined with a chromium compound. Furthermore the organoaluminum component is obtained by reacting a trialkylaluminum compound with a carbinol, a silanol or siloxane. The process according to the present invention does not comprise the specific organometallic compound.

The invention will be elucidated by means of the following non-limiting examples.

EXAMPLES

The properties of the polymers produced in the Examples were determined as follows:
Flow Index:
Melt Index (2.16): ASTM D-2338 Condition E measured at 190° C. reported as grams per 10 minutes.
Flow Index: ($FI_{21}$) ASTM D-1238 Condition F measured at 190° C. using 10 times the weight as used in Melt Index above.
MFR: melt flow ratio is the flow index/melt index
Density:
The density (g/cm$^3$) was determined as specified in ASTM D 1505-68 with the exception that the density measurement was taken 4 hours instead of 24 hours after the sample was placed in the density column
Gel Permeation Chromatography (GPC):
Polymer molecular weight and its distribution (MWD) were determined by Polymer Labs 220 gel permeation chromatograph. The chromatograms were run at 150° C. using 1,2,4-trichlorobenzene as the solvent with a flow rate of 0.9 ml/min The refractive index detector is used to collect the signal for molecular weights. The software used is Cirrus from PolyLab for molecular weights from GPC. The calibration of the HT-GPC uses a Hamielec type calibration with broad standard and fresh calibration with each sample set.
Experiments A-F
Preparation of an Activator Comprising the Reaction Mixture of an Alkyl Boron Compound and/or an Alkyl Aluminum Compound and a Nitrogen Containing Compound Under a dry nitrogen atmosphere, a Schlenk flask was charged with triisobutyl aluminium (TIBAL) (heptane solution), triethyl aluminium (TEAL) or triethyl boron (TEB) and a hexane solution (temperature 65° C.) of octadecylamine ($C_{18}H_{37}NH_2$). The molar ratio Al/N or B/N is indicated in Table 1. The compounds were mixed to form a colour solution.

TABLE 1

| | Aluminum or boron alkyl compound | Nitrogen compound | Al/N or B/N molar ratio |
|---|---|---|---|
| A | TIBAL (1M) | $C_{18}H_{37}NH_2$ | 1 |
| B | TIBAL (1M) | $C_{18}H_{37}NH_2$ | 1.5 |
| C | TIBAL (1M) | $C_{18}H_{37}NH_2$ | 2 |
| D | TMAL (2M) | $C_{18}H_{37}NH_2$ | 2 |
| E | TEAL (1M) | $C_{18}H_{37}NH_2$ | 2 |
| F | TEB (1M) | $C_{18}H_{37}NH_2$ | 2 |

Examples I-IV and Comparative Example A

Polymerisation in Slurry Process

The $CrO_3$ catalyst (F3; Dow) was used as the catalyst in the polymerisation of ethylene and 1-butene as the comonomer. The polymerisations were carried out in a two-liter stirred autoclave, in deoxygenated isopentane. Polymerisations were carried out at 100° C. and 15 bars ($15.10^5$ MPa) of total pressure. The activators according to Experiments A-D were used in an amount of 1 ml. Ethylene gas was used to maintain this pressure. Upon completion of the polymerisation, the reactor was vented and cooled to ambient temperature to recover the polymer. Details of each polymerisation and characteristics of the resins produced are provided in Table 2.

TABLE 2

| | Activator | Prod. (g PE/g cat · h) | $MI_5$ | FI | MFR | Mw | Mw/Mn |
|---|---|---|---|---|---|---|---|
| I | C | 402 | 0.4 | 10.5 | 26 | 207,500 | 36.8 |
| II | A | 230 | 0.12 | 7.0 | 58 | 500,000 | 88.9 |
| III | B | 296 | 0.1 | 6.7 | 67 | 681,000 | 122.7 |
| IV | D | 210 | 0.27 | 11.8 | 44 | 403,000 | 49.7 |
| A | TEAL | 278 | 5.8 | 78.0 | 13 | 123,200 | 16.7 |

Example V and Comparative Examples B-C

Polymerisation in a Gas Phase Process

The polymerisations were carried out in a two-liter autoclave equipped with a helical stirrer with a $CrO_3$ catalyst (F3; Dow). NaCl (300 g), which has been baked for 24 hours over 120° C. was used as seed bed. Mixtures B and C were applied as activator. Polymerisations were carried out at 102° C. and 20 bar ($20.10^5$ MPa) of total pressure. Ethylene gas was used to maintain this pressure. Upon completion of the polymerisation, the reactor was vented and cooled to ambient temperature to recover the mixture of NaCl and polyethylene polymer. The mixture was stirred in water for 24 hours before being filtered and dried to recover the polymer.

TABLE 3

| | Activator | Al/Cr Molar ratio | Prod. (g PE/g cat · h) |
|---|---|---|---|
| V | B | 6.7 | 408 |
| B | TIBAL | 6.7 | 167 |
| C | TEAL | 6.7 | 133 |

These examples show that the mixture comprising TIBAL and $C_{18}H_{37}NH_2$ improves the productivity.

Examples VI-VIII and Comparative Examples D-F

Polymerisation in a Gas Phase Process

The polymerisations were carried out in another two-liter autoclave equipped with a helical stirrer with a $CrO_3$ catalyst (F3; Dow). NaCl (300 g), which has been baked for 24 hours over 120° C. was used as seed bed. Mixture C was applied as activator. Polymerisations were carried out at 102° C. and 20 bar ($20.10^5$ MPa) of total pressure. Ethylene gas was used to maintain this pressure. Upon completion of the polymerisation, the reactor was vented and cooled to ambient temperature to recover the mixture of NaCl and polyethylene polymer. The mixture was stirred in water for 24 hours before being filtered and dried to recover the polymer.

TABLE 4

| | Activator | Al/Cr | Prod. (g PE/g cat · h) |
|---|---|---|---|
| VI | C | 6.7 | 133 |
| VII | C | 13 | 260 |
| VIII | C | 20 | 307 |
| D | TEAL | 6.7 | 67 |
| E | TIBAL | 6.7 | 93 |
| F | TIBAL | 20 | 87 |

These examples show that activator C improves the productivity.

The invention claimed is:

1. A process for the production of high density polyethylene comprising:
polymerizing ethylene in the presence of a supported chromium oxide based catalyst and an activator, wherein the activator comprises the reaction mixture of a boron compound and/or an alkyl aluminium compound; and a nitrogen containing compound wherein the boron compound is a ($C_1$-$C_{10}$) alkyl boron compound or a ($C_5$-$C_{20}$) aromatic boron compound, wherein the alkyl aluminum compound is an organo aluminium compound having the formula $AlR_3$ in which R is a hydrocarbon radical containing 1-10 carbon atom and wherein the nitrogen containing compound comprises —$NH_2$, —NHR, and/or —$NR_2$, wherein R may be an alkyl or a substituted alkyl having from 1 to 40 carbon atoms; wherein the nitrogen containing compound is decylamine, undecylamine, octylamine, octadecylamine, dodecylamine, N-methyloctadecylamine, N-ethyl-dodecylamine, hexadecylamine and/or N—N" dimethyl-n-octadecylamine.

2. The process according to claim 1, wherein the alkyl boron compound is trimethyl boron, triethyl boron or tripropyl boron.

3. The process according to claim 1, wherein the nitrogen containing compound is octadecylamine, dodecylamine and/or hexadecylamine.

4. The process according to claim 1, wherein the organo aluminum compound of the formula $AlR_3$ is trimethyl aluminium, triethyl aluminium, triisobutyl aluminium, tri-n-hexyl aluminium and/or tri octyl aluminium.

5. The process according to claim 1, wherein the process is in a slurry process.

6. The process according to claim 1, the process is a gas phase process.

7. The process according to claim 1, wherein the nitrogen containing compound is octadecylamine.

8. The process according to claim 2, wherein the alkyl boron compound is triethyl boron.

9. The process according to claim 8, wherein the polymerizing takes place in the presence of a diluent and the boron concentration in the polymerisation reactor is less than 30 ppm of boron based on the diluent.

10. The process according to claim 4, wherein the organo aluminum compound of the formula $AlR_3$ is trimethyl aluminium, triethyl aluminium, and/or triisobutyl aluminium.

11. The process according to claim 10, wherein the organo aluminum compound of the formula $AlR_3$ is triisobutyl aluminium.

12. The process according to claim 10, wherein the organo aluminum compound of the formula $AlR_3$ is trimethyl aluminium.

13. The process according to claim 1, wherein when the alkyl aluminium compound is present, a molar ratio of aluminium to nitrogen ranges between 0.1:1 and 4:1 and wherein when the boron compound is present, a molar ratio of boron to nitrogen ranges between 0.1:1 and 4:1.

14. The process according to claim 13, wherein the molar ratio of aluminium to nitrogen ranges between 0.1:1 and less than 2:1 and wherein the molar ratio of boron to nitrogen ranges between 0.1:1 and less than 2:1.

15. The process according to claim 1, wherein the molar ratio of aluminium to chromium ranges between 0.01:100 and 100:1.

* * * * *